US009182087B2

(12) United States Patent
Chen et al.

(10) Patent No.: US 9,182,087 B2
(45) Date of Patent: Nov. 10, 2015

(54) LIGHT GUIDE AND A LIGHT DEVICE INCORPORATING THE SAME

(71) Applicant: Radiant Opto-Electronics Corporation, Kaohsiung (TW)

(72) Inventors: Wei-Hsuan Chen, Kaohsiung (TW);
Yung-Hui Tai, Kaohsiung (TW);
Chun-Yi Wu, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 154 days.

(21) Appl. No.: 14/147,037

(22) Filed: Jan. 3, 2014

(65) Prior Publication Data

US 2014/0355271 A1 Dec. 4, 2014

(30) Foreign Application Priority Data

Jun. 3, 2013 (TW) .............................. 102119591 A

(51) Int. Cl.

| *F21V 7/04* | (2006.01) |
|---|---|
| *F21K 99/00* | (2010.01) |
| *F21V 8/00* | (2006.01) |
| *F21Y 103/00* | (2006.01) |

(52) U.S. Cl.
CPC .............. F21K 9/52 (2013.01); G02B 6/0096 (2013.01); *F21Y 2103/003* (2013.01)

(58) Field of Classification Search
CPC ... G02B 6/0055; G02B 6/0068; G02B 6/0096
USPC ......................................... 362/628, 611, 612
See application file for complete search history.

(56) References Cited

U.S. PATENT DOCUMENTS

| 7,080,932 B2 * | 7/2006 | Keuper .......................... 362/613 |
| 7,286,296 B2 * | 10/2007 | Chaves et al. ................. 359/641 |

(Continued)

FOREIGN PATENT DOCUMENTS

| CN | 101371074 A | 2/2009 |
| CN | 202523757 U | 11/2012 |
| EP | 0881514 A1 | 12/1998 |

(Continued)

OTHER PUBLICATIONS

Search Report dated Mar. 16, 2015 for corresponding Chinese Patent Application No. 2013102162237 (English language translation only).

(Continued)

*Primary Examiner* — Ali Alavi
(74) *Attorney, Agent, or Firm* — Pepper Hamilton LLP

(57) ABSTRACT

A light guide includes a light input surface which has two first edges, an output surface parallel to and larger than the input surface, and two connecting surfaces, each of which interconnects the light input surface and said light input surface and has an inclined segment. Relationships of $\theta<\theta_T$ and $L>(AD)/(\tan\theta_T)$ are satisfied, where $\theta$ is an included angle defined between extensions of the inclined segments of the connecting surfaces, $\theta_T$ is a critical angle for total internal reflection associated with the light guide, (L) is a distance between the light input and output surfaces, and (AD) is a distance between a location of incidence of a light beam on the light input surface and one of the first edges.

9 Claims, 4 Drawing Sheets

(56) References Cited

U.S. PATENT DOCUMENTS

| | | | |
|---|---|---|---|
| 7,352,011 B2 * | 4/2008 | Smits et al. | 257/99 |
| 2007/0024971 A1 | 2/2007 | Cassarly et al. | |

FOREIGN PATENT DOCUMENTS

| | | | |
|---|---|---|---|
| EP | 1388461 A2 | 2/2004 | |
| JP | 2010230933 A | 10/2010 | |
| TW | 201303222 A | 1/2013 | |
| WO | 2012083957 A1 | 6/2010 | |
| WO | WO 2012/145293 A2 | 10/2012 | |

OTHER PUBLICATIONS

Search Report for corresponding Taiwan Patent Application No. 102119591 dated Jun. 30, 2015.

* cited by examiner

LIGHT GUIDE AND A LIGHT DEVICE INCORPORATING THE SAME

CROSS-REFERENCE TO RELATED APPLICATION

This application claims priority of Taiwanese Application No. 102119591, filed on Jun. 3, 2013.

BACKGROUND OF THE INVENTION

1. Field of the Invention

The invention relates to an optical element, more particularly to a light guide and a lighting device incorporating the same.

2. Description of the Related Art

A long fluorescent lamp or multiple round light bulbs are often used in exhibition venues where sufficient lighting for a long or large display area is required. However, the light emitted by a single fluorescent lamp tends to be scattered and inefficient; and the light from thus multiple round light bulbs tends to overlap and is thus uneven. In addition, increasing the number of lamps also increases the costs of lighting.

With reference to FIG. 1, Patent Application Publication No. WO2012/145293 intends to solve the above mentioned issue with a conventional lighting assembly 1 comprising a light guide 11, a light source 12 disposed on a light input end of the light guide 11, and a banding reduction element 13 disposed on a light output end of the light guide 11. The light source 12 includes a plurality of light emitting diodes (LEDs) 121. The light emitted from the LEDs 121 is regulated by the light guide 11 and then passes through the banding reduction element 13 to achieve a condensed lighting effect. However, the conventional lighting assembly 1 requires an additional banding reduction element 13 which adds to the number of components and manufacturing complexity.

SUMMARY OF THE INVENTION

Therefore, the object of the present invention is to provide a light guide for creating a condensed lighting effect without requiring extra optical components.

According to one aspect of the present invention, there is provided a light guide for guiding a light beam to a suitable angle including a light input surface, a light output surface and two connecting surfaces. The light input surface has two first edges that are opposite to each other in a first direction. The light output surface is parallel to and larger than the light input surface, and is spaced apart from the light input surface in a second direction that is transverse to the first direction. The two connecting surfaces are spaced apart from each other in the first direction, and each of which interconnects the light input surface and the light output surface and has an inclined segment.

A relationship of $\theta < \theta_T$ is satisfied, where $\theta$ is an included angle defined between extensions of the inclined segments of the connecting surfaces, and $\theta_T$ is a critical angle for a total internal reflection associated with the light guide.

Another relationship of $L > (AD)/(\tan \theta_T)$ is satisfied, where (L) is a distance between the light input surface and the light output surface, and (AD) is a distance between a location of incidence of the light beam on the light input surface and one of the first edges of the light input surface.

Another object of the present invention is to provide a lighting device incorporating the above-mentioned light guide. According to another aspect of the present invention, there is provided a lighting device that includes a light source and the aforesaid light guide for receiving light emitted from the light source.

The lighting device according to the present invention is able to condense the light emitted from the light source without an extra banding reduction element through the design of the light guide with the appropriate parameters.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
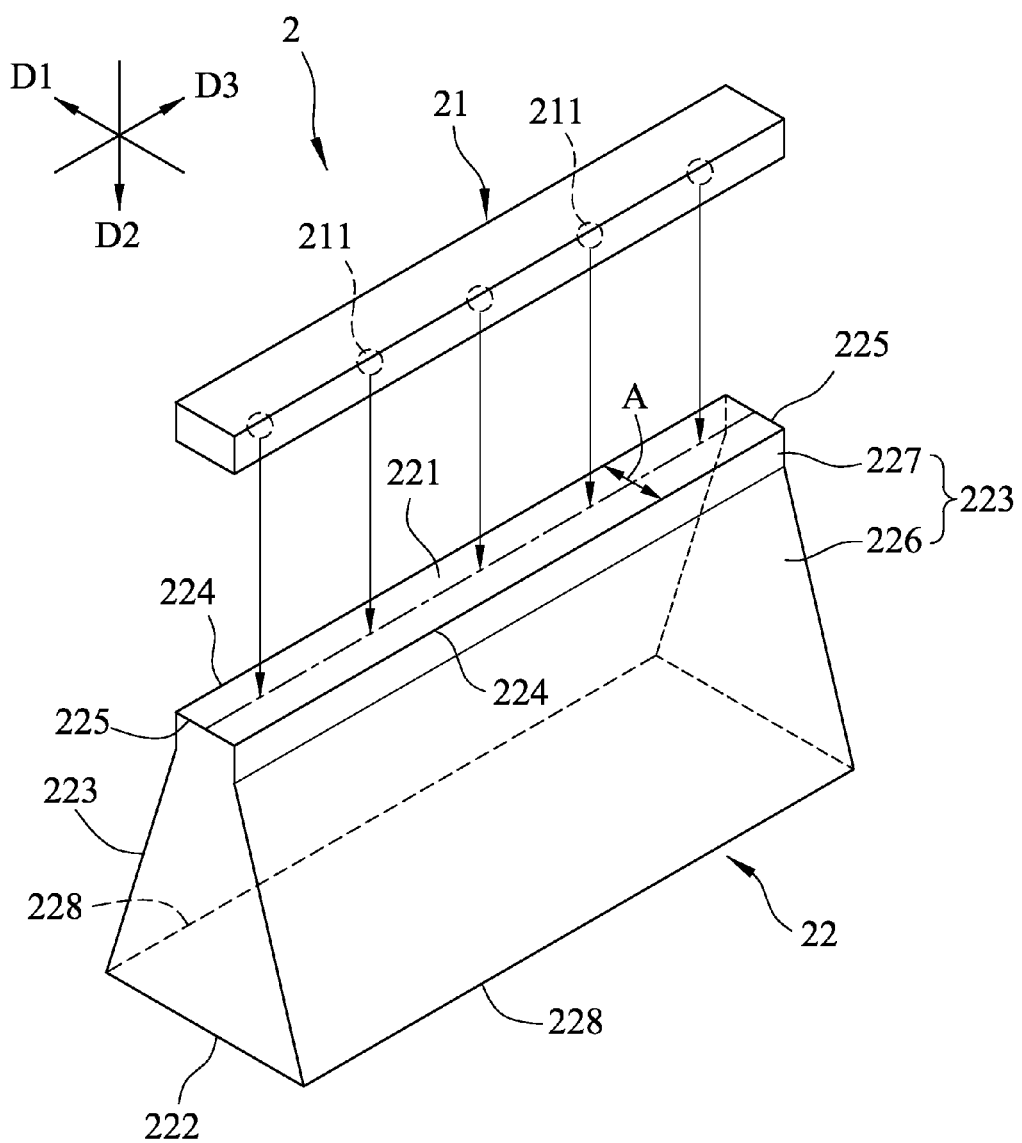
FIG. 3 is a perspective view of a lighting device according to the preferred embodiment of the present invention.

Referring to FIG. 3, the preferred embodiment of a lighting device 2 for guiding a light beam to a suitable angle according to the present invention includes a light source 21 and a light guide 22 for receiving light from the light source 21. In this embodiment, the light source 21 includes a plurality of light emitting diodes (LEDs) 211, but is not limited thereto.

Figure 4:
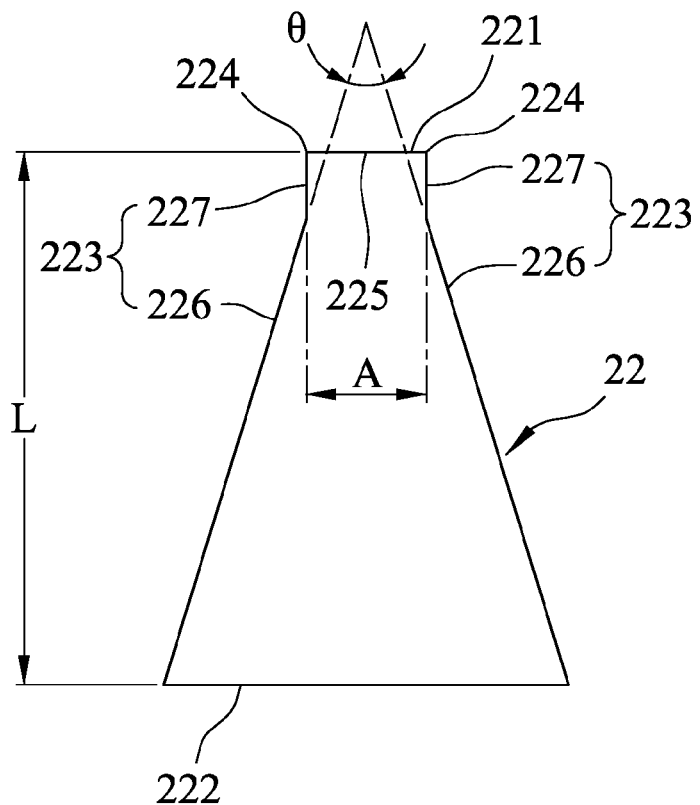
FIG. 4 is a side view of a light guide of the preferred embodiment.

Referring to FIGS. 3 and 4, the light guide 22 includes a light input surface 221, a light output surface 222, and two connecting surfaces 223. The light input surface 221 has two first edges 224 that are opposite to each other in a first direction (D1). The light output surface 222 is parallel to and larger than the light input surface 221, is spaced apart from the light input surface 221 in a second direction (D2) transverse to the first direction (D1), and has two third edges 228 that are opposite to each other in the first direction (D1). The light input surface 221 further has two second edges 225 that are opposite to each other in a third direction (D3) transverse to the first and second directions (D1) (D2). Each of the connecting surfaces 223 interconnects a respective one of the third edges 228 of the light output surface 222 and a respective one of the first edges 224 of the light input surface 221.

Each of the connecting surfaces 223 has an inclined segment 226 connected to the respective one of the third edges 228 of the light output surface 222, and a straight segment 227 interconnecting the inclined segment 226 and the respective one of the first edges 224 of the light input surface 221, and extending in the second direction (D2).

Under the abovementioned configuration, a relationship of $\theta < \theta_T$ is satisfied, where $\theta$ is an included angle defined between extensions of the inclined segments 226 of the connecting surfaces 223, and $\theta_T$ is a critical angle for a total internal reflection associated with the light guide 22.

In addition, another relationship of $L > (AD)/(\tan \theta_T)$ is satisfied, where (L) is a distance between the light input surface 221 and the light output surface 222, and (AD) is a distance between a location of incidence of the light beam on the light input surface 221 and one of the first edges of the light input surface 221. In the preferred embodiment, the LEDs 211 of the light source 21 are disposed linearly to correspond in position to a central axis of the light input surface 221 (see FIG. 3), such that AD=A/2 where (A) is the distance between the two first edges 224 of the light input surface 221. However, AD may vary depending on the position and orientation of the LEDs 211 that affect the angle and position of incidence of a light beam on the light input surface 221. A condensed lighting effect may still be achieved even when AD is varied such as when AD is 0.3 A or 0.7 A.

θ and (L) are both parameters for controlling an angle of beam exiting the light guide 22. The light emitted from the light source 21 enters the light guide 22 through the light input surface 221, experiences total internal reflections between the two connecting surfaces 223 and eventually exits from the light output surface 222.

Experiments were conducted under the condition of AD=A/2 using light guides made of two different materials, Polycarbonate (PC) and Polymethylmethacrylate (PMMA), and having different dimensions, and the results are shown in Table 1 below.

TABLE 1

| Material | PMMA | | | | PC | | | |
|---|---|---|---|---|---|---|---|---|
| Index of Refraction (n) | 1.49 | | | | 1.59 | | | |
| Critical Angle ($\theta_T$) | 42.16° | | | | 38.97° | | | |
| A (mm) | 4 | | | | | | | |
| (A/2)/(tan$\theta_T$) (mm) | 2.2 | | | | 2.5 | | | |
| L (mm) | 30 | 30 | 2 | 2 | 30 | 30 | 2 | 2 |
| θ (°) | 18 | 45 | 18 | 45 | 18 | 40 | 18 | 40 |
| Angle of Beam (°) | 30 | 120 | 120 | 120 | 36 | 120 | 120 | 120 |
| Test Group Number | (1) | (2) | (3) | (4) | (5) | (6) | (7) | (8) |

While test groups (1) and (2) satisfy the relationship of L>(A/2)/(tan $\theta_T$) (30 mm>2.2 mm), group (2) does not satisfy the relationship of $\theta<\theta_T$ (45°>42.16°) and thus has an angle of beam of 120°. Therefore, a condensed lighting effect is not achieved. On the other hand, test group (1) simultaneously satisfies the relationship of $\theta<\theta_T$ (18°<42.16°) and has an angle of beam of 30°, thereby achieving a condensed lighting effect.

With both test groups (3) and (4) not satisfying the relationship of L>(A/2)/(tan $\theta_T$) (2 mm<2.2 mm), the angle of beam thereof are not reduced even when group (3) satisfies the condition of $\theta<\theta_T$. Test results of test groups (5) to (8) show similar results as groups (1) to (4). Hence, it is concluded that both conditions of $\theta<\theta_T$ and L>(A/2)/(tan $\theta_T$) have to be met at the same time to achieve a condensed lighting effect.

Figure 5:
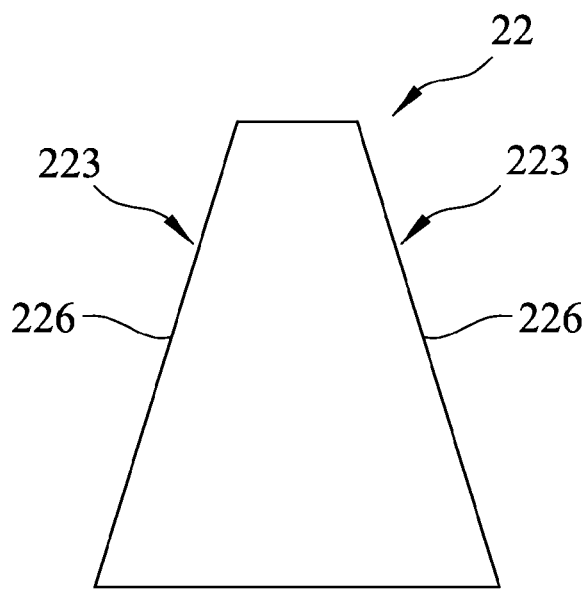
FIG. 5 is a side view of a variation of the light guide.

Referring back to FIG. 3, the design of straight segments 227 of the connecting surfaces 223 facilitates clamping of the light source 21 to the light guide 22. An alternative design of the connecting surfaces 223 is to have only the inclined segments 226 but not the straight segments 227 as shown in FIG. 5. In this case, the light source 21 needs to be glued or otherwise attached to the light guide 22. Similar test results can be obtained when the light guide of the alternative design is tested.

Figure 1:
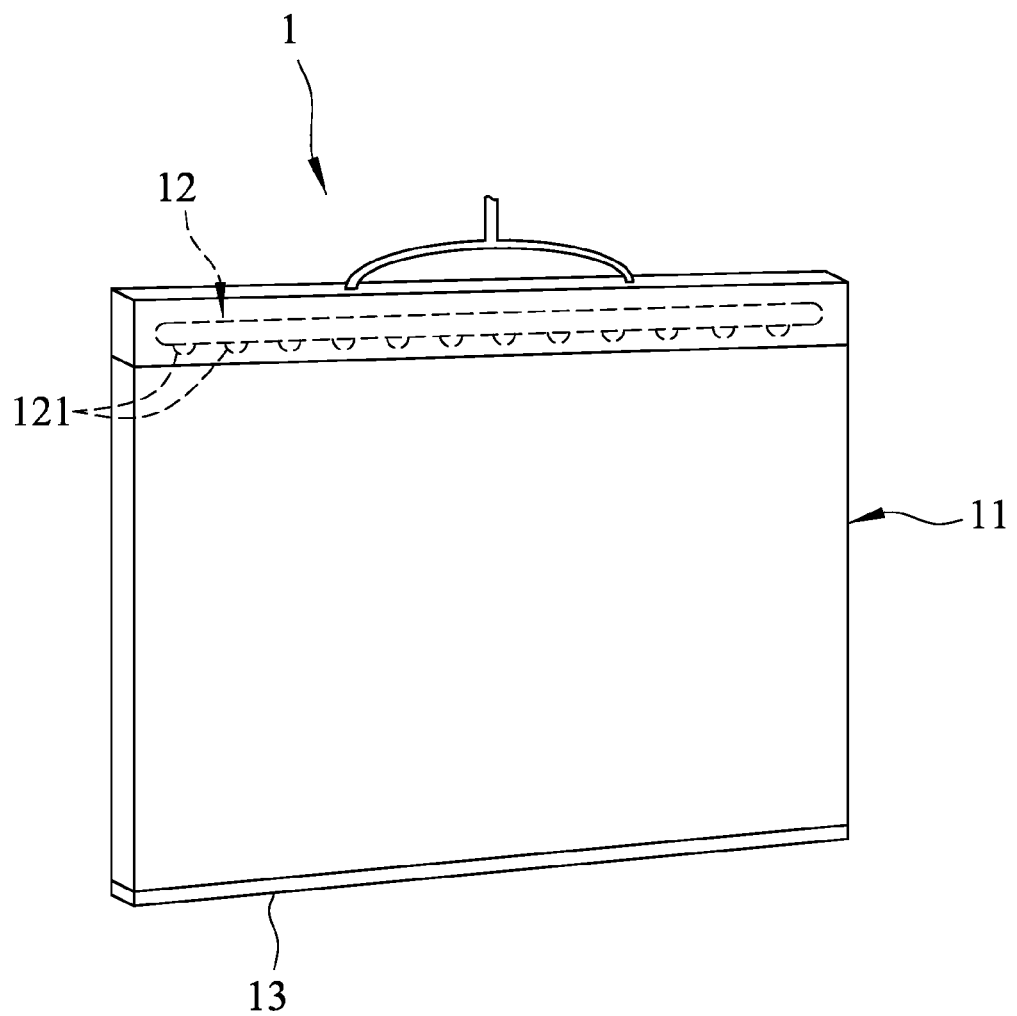
FIG. 1 is a perspective view of a conventional lighting assembly disclosed in WO2012/145293.
Figure 2:
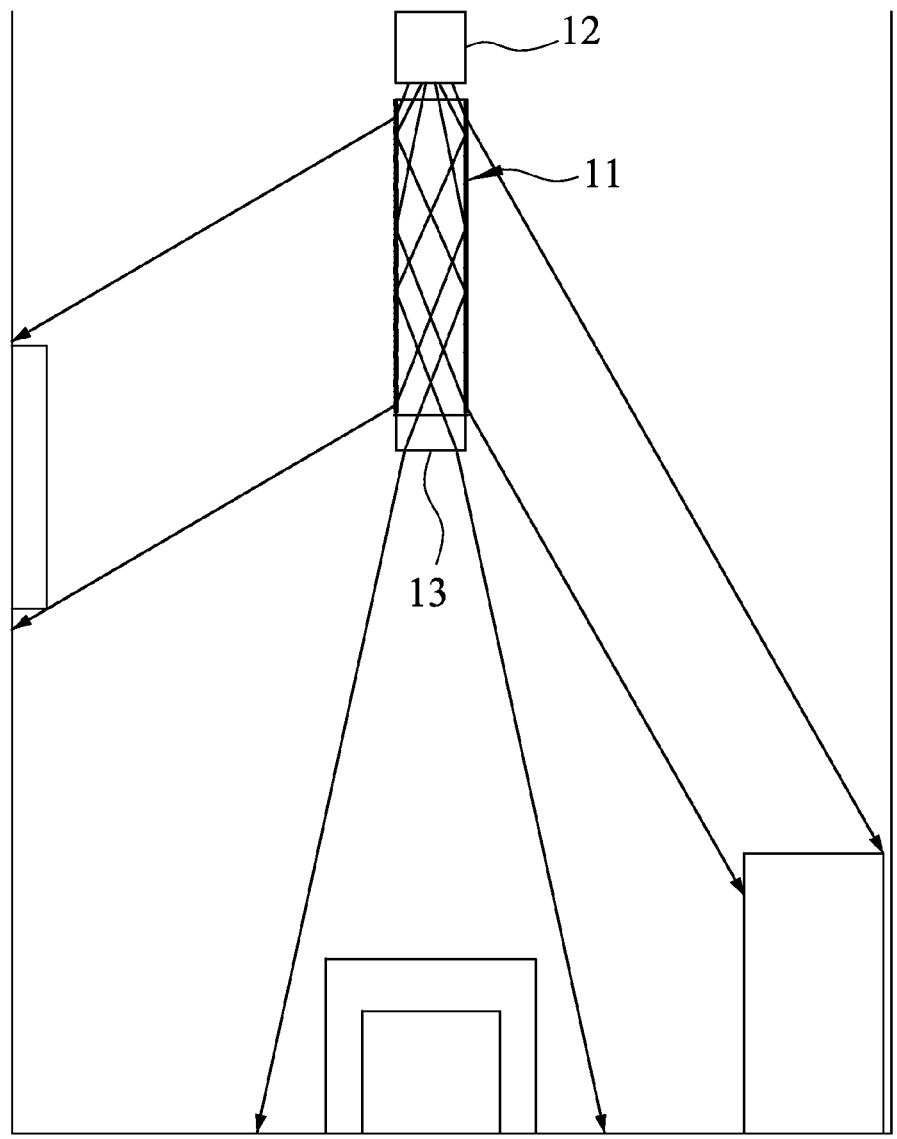
FIG. 2 is a side view of the conventional lighting assembly in use.

To conclude, the lighting device 2 according to the present invention is able to condense the light emitted from the light source 21 without an extra banding reduction element 13 (see FIG. 1) through the design of the light guide 22 with the appropriate parameters.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A light guide for guiding a light beam to a suitable angle, comprising:
   a light input surface having two first edges that are opposite to each other in a first direction;
   a light output surface being parallel to and larger than said light input surface and being spaced apart from said light input surface in a second direction that is transverse to the first direction; and
   two connecting surfaces spaced apart from each other in the first direction, each of which interconnects said light output surface and said light input surface and has an inclined segment;
   wherein a relationship of $\theta<\theta_T$ is satisfied, where θ is an included angle defined between extensions of said inclined segments of said connecting surfaces, and $\theta_T$ is the critical angle for total internal reflection associated with said light guide; and
   wherein a relationship of L>(AD)/(tan$\theta_T$) is satisfied, where (L) is a distance between said light input surface and said light output surface, and (AD) is a distance between a location of incidence of the light beam on said light input surface and one of the said first edges of said light input surface.

2. The light guide of claim 1, wherein each of said connecting surfaces further has a straight segment that is connected between said inclined segment and the respective one of said first edges of said light input surface and that extends in the second direction.

3. The light guide of claim 1, wherein said light guide is symmetrically formed in the first direction.

4. The light guide of claim 1, wherein AD=A/2 and (A) is a distance between said two first edges of said light input surface, the light beam entering said light guide at the center of said light input surface.

5. A lighting device comprising:
   a light source; and
   a light guide for guiding a light beam that is emitted from said light source to a suitable angle, and including
   a light input surface that has two first edges opposite to each other in a first direction,
   a light output surface that is parallel to and larger than said light input surface and that is spaced apart from said light input surface in a second direction transverse to the first direction, and
   two connecting surfaces that are spaced apart from each other in the first direction, each of which interconnects said light output surface and said light input surface and has an inclined segment;
   wherein a relationship of $\theta<\theta_T$ is satisfied, where θ is an included angle defined between extensions of said inclined segments of said connecting surfaces, and $\theta_T$ is the critical angle for total internal reflection associated with said light guide; and
   wherein a relationship of L>(AD)/(tan $\theta_T$) is satisfied, where (L) is a distance between said light input surface and said light output surface, and (AD) is a distance between a location of incidence of the light beam on said light input surface and one of the said first edges of said light input surface.

6. The lighting device of claim 5, wherein each of said connecting surfaces further has a straight segment that is connected between said inclined segment and the respective one of said first edges of said light input surface and that extends in the second direction.

7. The lighting device of claim 5, wherein said light guide is symmetrically formed in the first direction.

8. The lighting device of claim 5, wherein said light source includes a plurality of LEDs disposed linearly.

9. The lighting device of claim 8, wherein AD=A/2, (A) is a distance between said two first edges of said light input surface, and said LEDs are disposed to correspond in position to a central axis of said light input surface, such that the location of incidence of the light beam is at the centre of said light input surface of said light guide.

* * * * *